United States Patent [19]
Horwitz et al.

[11] Patent Number: 5,169,609
[45] Date of Patent: Dec. 8, 1992

[54] COMBINED TRANSURANIC-STRONTIUM EXTRACTION PROCESS

[75] Inventors: E. Philip Horwitz, Naperville; Mark L. Dietz, Evanston, both of Ill.

[73] Assignee: The United States of America as represented by the United States Department of Energy, Washington, D.C.

[21] Appl. No.: 717,426

[22] Filed: Jun. 19, 1991

[51] Int. Cl.$^5$ ............................................. C22B 60/02
[52] U.S. Cl. ..................................... 423/10; 423/49; 423/157; 252/631
[58] Field of Search ........................ 423/10, 9, 49, 157; 252/627, 631; 564/15

[56] References Cited

U.S. PATENT DOCUMENTS

| | | | |
|---|---|---|---|
| 4,548,790 | 10/1985 | Horwitz et al. | 423/9 |
| 4,574,072 | 3/1986 | Horwitz et al. | 423/9 |
| 4,683,124 | 7/1987 | Muscatello et al. | 423/6 |
| 4,749,518 | 6/1988 | Davis, Jr. at al. | 252/627 |
| 4,835,107 | 5/1989 | Horwitz et al. | 436/82 |
| 4,917,825 | 4/1990 | McDowell et al. | 252/631 |
| 4,922,012 | 5/1990 | Kem | 564/15 |
| 5,028,402 | 7/1991 | Foos et al. | 423/8 |
| 5,100,585 | 3/1992 | Horwitz et al. | 252/631 |

OTHER PUBLICATIONS

McDowell et al., "Investigations of Ion-Size-Selective Synergism in Solvent Extraction", Sep. Sci. & Techn., 18 (14 & 15) pp. 1483-1507, 1983.
Chiarizia et al., "Diluent Effects in the Extraction of Am (III) from Nitric Acid Solutions by Selected Carbamoy-phosphoryl Extractants and Related Monofunctional Compounds", Solvent Extraction & Ion Exchange, 10(1), 101-118 (1992).
Horwitz et al, Selected Alkyl(phenyl)-N,N-dialkylcarbamoylmethylphosphine Oxides as extractants for Am (III) from Nitric Acid Media, Sep. Science and Techn., 17 (10) pp. 1261-1279, Nov. 1982.
Horwitz et al., Carbamoylmethylphosphoryl Derivatives as Actinide Extractants and Their Significance in the Processing and Recovery of Plutonium and other Actinides, Argonne Nation Lab.
Kalina et al., The Extraction of Am (III) and Fe (III) by Selected Dihexyl N,N-Dialkylcarbamoylmethylphosphonates, -phosphinates and -phosphene oxides from Nitrate Media, Separation Science and Technology, 16(9), pp. 1127-1145, 1981.

Primary Examiner—Brooks H. Hunt
Assistant Examiner—Ngoclan T. Mai
Attorney, Agent, or Firm—James W. Weinberger; Thomas G. Anderson; William R. Moser

[57] ABSTRACT

The transuranic (TRU) elements neptunium, plutonium and americium can be separated together with strontium from nitric acid waste solutions in a single process. An extractant solution of a crown ether and an alkyl(-phenyl)-N,N-dialkylcarbanylmethylphosphine oxide in an appropriate diluent will extract the TRU's together with strontium, uranium and technetium. The TRU's and the strontium can then be selectively stripped from the extractant for disposal.

15 Claims, 3 Drawing Sheets

PRELIMINARY FLOWSHEET FOR PROCESSING SINGLE SHELL TANK SLUDGE USING COMBINED TRUEX-SREX PROCESS

COMBINED TRANSURANIC-STRONTIUM EXTRACTION PROCESS

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to a method for the recovery of actinide, strontium and technetium values together from an aqueous acid solution. More specifically, this invention relates to a process for the separation of uranium, the transuranic (TRU) elements neptunium, plutonium and americium, together with strontium and technetium from aqueous nitric acid waste solutions containing these and other values and for the separate recovery of TRU and strontium elements from the other recovered values.

The disposition of the radioactive waste which results from the processing of nuclear material for the production of nuclear weapons is a major problem. Many of these wastes are high level (HLW) and have been stored for long periods of time in single walled underground storage tanks which, because of the extended storage period, present a potential environmental hazard. The waste consists of a high level radioactive sludge containing transuranic (TRU) elements and $^{90}Sr$ and a radioactive alkaline liquid containing primarily $^{137}Cs$. Ideally, the waste stored in these tanks should be removed and processed for long-term storage in a deep geographic repository. Because of the expense associated with long-term storage, it is desirable to minimize the volume of radioactive waste by first removing the long-lived actinides, particular in neptunium, plutonium and americium. Another element which must be removed is the major heat-producing isotope $^{90}Sr$ which, if left in the waste as it is solidified for storage, will produce as significant amount of heat which must be removed from the stored waste solid. The remaining waste is not sufficiently radioactive to require placement in a deep geologic repository. Only the actinide fraction will require such placement.

In present nuclear waste processing technology, the TRU values are recovered from nitric acid waste solutions by the methods described in U.S. Pat. Nos. 4,548,790 and 4,574,072, both assigned to the U.S. Department of Energy and incorporated herein by reference. U.S. Pat. No. 4,548,790 describes a method for the recovery of lanthanide and actinide values from aqueous nitric acid solutions utilizing any of various neutral bifunctional extractants, the alkyl(phenyl)-N,N-dialkyl-carbamoyl-methylphosphine oxides, hereinafter referred to as CMPO's, in an appropriate diluent such as diethylbenzene. U.S. Pat. No. 4,574,072, describes an improvement in the use of CMPO for extracting lanthanide and actinide values from acid solutions by the substitution of normal paraffin hydrocarbons containing a phase modifier such as tri-n-butyl phosphate (TBP) as the diluent.

Strontium and technetium values are recovered from nitric acid waste solutions by the process described in U.S. patent application Ser. No. 506,125, filed Apr. 9, 1990 in the name of the U.S. Department of Energy and incorporated herein by reference. The process utilizes an extractant solution consisting of a macrocyclic polyether or "crown ether" such as dicyclohexano-18-crown-6 (DCH18C6) in a diluent which capable of dissolving a substantial quantity of water and in which the crown ether is soluble such as 1-octanol.

Although these processes are separately effective, they do require two completely separate processes, increasing the cost and the complexity of the recovery operation.

There is a clear need therefore, for a single recovery process which could extract the TRU values (neptunium, americium and plutonium) and the strontium values in a single operation rather than in two separate ones as is presently necessary. Such a process would require less space and equipment, would be easier to control than two separate extraction processes and would require the handling of only one process stream. However, the prior art extractants, CMPO and crown ethers are not compatible together in paraffinic hydrocarbon diluents, forming in addition to the normal aqueous and organic phases, a second organic phase. In addition to the usual problems with phase separation encountered when a third phase is present, there is a strong potential for achieving criticality since any plutonium present in the waste stream tends to concentrate in the second organic phase.

It has been found that by the careful selection of diluent, it is possible to combine the CMPO and crown ether, to prepare a new extractant solution which will extract the TRU elements (i.e. neptunium, plutonium and americium) together with strontium in a single process stream.

SUMMARY OF THE INVENTION

A process has been developed for recovering neptunium, americium and plutonium values together with strontium values from an aqueous nitric acid fuel solution containing these and other fission product values by contacting the aqueous acid solution containing the values with an extractant solution consisting of a crown ether and an alkyl(phenyl)-N,N-dialkylcarbamoylmethylphosphine oxide in a diluent, said diluent being selected from the group consisting of tri-n-butylphosphate and a normal or iso paraffinic hydrocarbon having 10 to 15 carbons to which has been added a phase modifier, maintaining the contact for a period of time sufficient for the strontium, neptunium, americium and plutonium values in addition to any uranium and technetium values in the feed solution to be taken up by the extractant, separating the loaded extractant from the feed solution, contacting the loaded organic extractant solution with a strip solution, which may be either an aqueous solution of 0.1 to 0.5M tetrahydrofuran-2,3,4,5-tetracarboxylic acid (THFTCA), or 0.05 to 0.10M nitric acid and M hydrogen fluoride to strip the strontium, neptunium, americium and plutonium values from the extractant, thereby separating the strontium, neptunium, americium and plutonium values from the nitric acid feed solution.

It is therefore the object of the invention to provide a method for the recovery of neptunium, plutonium, and americium values together with strontium values in a single extraction process.

DETAILED DESCRIPTION OF THE PREFERRED EMBODIMENT

Figure 1:
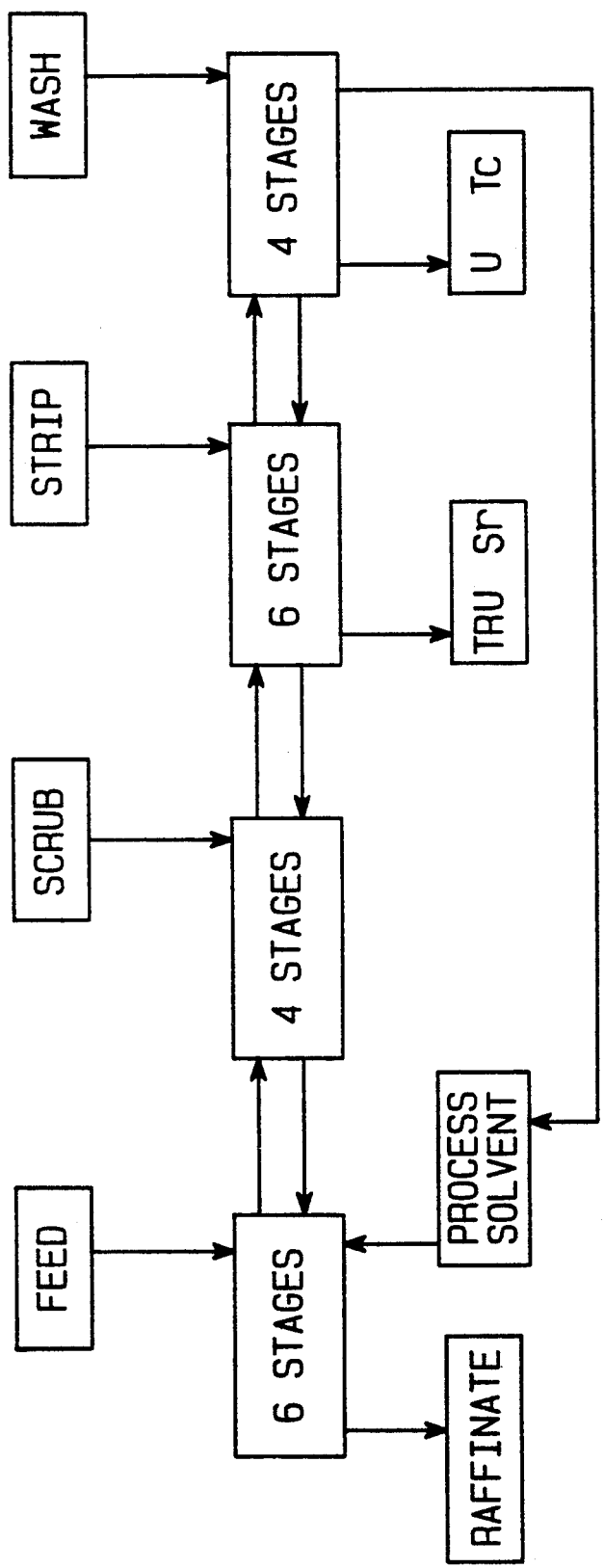
FIG. 1. is a flow diagram for the recovery of TRU and strontium values from single shell tank sludge.

This and other objects of the invention for the recovery of neptunium, plutonium and americium values together with strontium values from an aqueous nitric acid nuclear waste solution containing these values, in addition to uranium, technetium, and other fission product and metal values may be met by adjusting the nitric acid content of the waste solution to from about 1 to 3M in nitric acid to form a feed solution, contacting the aqueous feed solution with an organic extractant solution consisting of about 0.2M n-octyl(phenyl)-N,N-diisobutylcarbamoylmethylphosphine oxide, about 0.2M bis-4,4'(5')[t-butylcyclohexano]-18-crown-6, and about 1.2M tri-n-butylphosphate as a phase modifier in a diluent which is a mixture of iso-paraffinic hydrocarbons containing 10 to 12 carbons, maintaining the contact for a period of time sufficient for the neptunium, americium, plutonium, uranium, strontium, and technetium values in the feed solution to be taken up by the organic extractant solution, separating the loaded extractant solution from the feed solution, and contacting the loaded extractant solution with an aqueous solution containing about 0.3M tetrahydrofuran-2,3,4,5-tetracarboxylic acid (THFTCA) to strip the neptunium, plutonium, americium, and strontium values from the loaded extractant solution, thereby separating the neptunium, plutonium, americium and strontium values from the nitric acid feed solution. The uranium and technetium values can then be stripped from the extractant solution and recycled (uranium) or disposed of (technetium) in an appropriate manner.

Prior to stripping, the loaded organic extraction solution is preferably contacted with a 1.0 to 3.0M, preferably 2.0M aqueous nitric acid solution to obtain additional decontamination from coextracted elements such as barium.

The process of the invention is useful for the recovery of the TRU values, neptunium, plutonium and americium, in addition to strontium, from nitric acid waste solutions containing these values in addition to other fission product and metal values. The aqueous feed solution may range from about 1 to 6M, preferably 1 to 3M in nitric acid. Since this process was designed to process nuclear waste containing quantities of metal values, it may also be made from about 0.05 to 0.2M, preferably 0.075M, in oxalic acid. The oxalic acid complexes any iron, zirconium or molybdenum values which may be present in the waste solution to prevent them from being co-extracted with the TRU and strontium values.

The extractant solution consists of a crown ether and a alkyl(phenyl)-N,N-dialkylcarbamoylmethylphosphine oxide in a suitable diluent. The crown ethers which are suitable for the process have the formula: 4,4'(5')[R,R']dicyclohexano-18-crown-6, where R and R' are one or more members selected from the group consisting of straight chain or branched alkyl groups containing 1 to 12 carbons. Examples of R and R' include methyl, propyl, isobutyl, t-butyl, hexyl, and heptyl. Preferably R and R' are t-butyl. Thus the preferred crown ether is bis-4,4'(5')[t-butylcyclohexano-18-crown-6 (Dt-BuCH18C6). The concentration of the ether may vary from about 0.1 to 0.4M with about 0.2M being preferred. It has been determined that the crown ether in most effective as an extractant when a majority of it is the cis-syn-cis isomer, rather than another isomer such as the cis-anti-cis form.

The only CMPO which has been found to be suitable is octyl(phenyl)-N,N-diisobutylcarbamoylmethylphosphine oxide (hereinafter referred to as $O\phi D[IB]C$-MPO). The concentration of extractant in a suitable diluent may range from about 0.1 to 0.3M, but is preferably about 0.2M.

Suitable diluents for the combined extractants are organic compounds in which both extractants are soluble and which do not form third phases. A problem is that the presence of uranium may result in the formation of a second organic phases. Thus, the diluent must permit the extractant solution to take-up a reasonable amount of uranium before the third phase is formed. A suitable diluent is tri-n-butyl phosphate (TBP) which does not form a third phase even with high uranium loadings. However, TBP is quite viscous at operating temperatures making phase contact and separation difficult. Other suitable diluents include normal or iso paraffinic hydrocarbons containing from 10 to 15 carbons to which is added a small amount of an appropriate phase modifier to inhibit third phase formation. One suitable hydrocarbon is n-dodecane. Another suitable diluent is a mixture of n-paraffinic hydrocarbons containing from 10 to 13 carbons, having a flash point of about 69° C. and containing about 13% $C_{10}$, 36% $C_{11}$, 44% $C_{12}$, and 47% $C_{13}$. This product is available commercially from EXXON as Norpar 12 ®. Still another diluent is a mixture of iso-paraffinic hydrocarbons containing 12 to 15 carbons, having a flash point of 80° C. and an average molecular weight of 191 and is available from EXXON as Isopar M ®. The preferred diluent with respect to uranium loading is a mixture of iso-paraffinic hydrocarbons containing from 10 to 12 carbons, having a flash point of 61° C. and an average molecular weight of 171. This diluent is also available commercially from EXXON under the tradename Isopar L ®.

The phase modifier is added to the extractant solution to improve solubility of the extractants in the organic diluent and to reduce or eliminate the formation of second organic phases, particularly when the extractant is loaded with metal ion. The preferred phase modifier is tri-n-butyl phosphate, however other organophosphorus compounds such as dibutyl butylphosphonate and tris(ethylhexyl)phosphine oxide may also be suitable. The amount of phase modifier may range from about 1.0 to about 1.5M with about 1.2M preferred.

The temperature at which the separation process takes place is not critical and may vary from about 25° to about 60° C. with about 40° C. being the generally preferred temperature due to the self-heating effect of the radioactive solutions. Furthermore, the higher temperature helps to reduce the viscosity of the extractant solution, particularly when using TBP as the diluent so that contact and separation of the aqueous and organic phases can take the place more easily. The upper temperature limit of the operation should be sufficiently below the flash point of the diluent being used to ensure safe operation.

In general, contact times are not critical, although 30 seconds has been found to be satisfactory to achieve adequate phase mixing. The actual extraction operation can be carried out in either a batch or continuous mode using, for example, simple mixer-settlers, direct or countercurrent flow centrifugal contactors, or using similar conventional type of equipment known to those skilled in the art. Phase ratios can be varied depending upon engineering considerations and economic factors.

A flow diagram for the recovery of the TRU values together with strontium values from single shell tank sludge is shown in FIG. 1. The system operates in a counter-current mode. Sludge recovered form the tank is dissolved in about 0.2M oxalic acid to complex iron, zirconium or molybdenum values which may be present. The sludge is then acidified to between about 1 to 6M nitric acid, preferably 3.0M, to form the feed solution.

The feed solution is then contacted with the organic extractant solution (0.2M is CMPO, 0.2M in crown ether in a diluent which is a mixture of iso-paraffinic hydrocarbons containing from 10 to 12 carbons, having a flash point of 61° C. and an average molecular weight of 171 and which contains about 1.2M TBP as a phase modifier), which extracts the neptunium, plutonium, americium, uranium, strontium and technetium values away from the feed solution. The aqueous to organic ratio is 1:1.

The loaded extraction solution is then contacted with an aqueous scrub solution which from about 1 to 3M, preferable 2M, in nitric acid to remove any iron, barium or fission products which may have carried over into the extractant. The organic to aqueous ratio is 4:1. The scrubbed, loaded extraction solution is then contacted with a first strip solution consisting of about 0.1 to 0.5, preferably 0.25M, tetrahydrofuran-2,3,4,5 tetracarboxylic acid (THFTCA) in water which strips the neptunium, plutonium, americium and strontium values from the extractant solution while the uranium and technetium values remain in the extractant. The organic to aqueous ratio is 2:1. The strontium values can then be separated from the TRU's and the separated values can then be mixed into a glass or other appropriate storage media and prepared for long-term storage in an appropriate facility.

The uranium and technetium values can be recovered from the extractant solution containing these values by contacting the extractant with a second aqueous strip solution of about 0.1 to 0.5M, preferably about 0.25M sodium carbonate solution.

The following Examples are given to illustrate the process of the invention and are not to be taken as limiting the scope of the invention as defined by the appended claims.

EXAMPLE I

The maximum possible metal ion loading of each of several potential process solvents was evaluated by combining measured volumes of preconditioned solvent with increasing volumes of 3M nitric acid containing a known concentration of uranyl nitrate in a culture tube. Chemical equilibration was attained by vigorous mixing of the two phases for several minutes. Following centrifugation, the mixture was examined for the presence of a third phase. Maximum loading values were taken as the maximum concentration of uranium which may be extracted into the organic phase without the appearance of a third phase. Table 1 below summarizes the results of metal ion loading studies carried out with each of the potential process solvents.

TABLE 1

Maximum Loading of Process Solvents
(Aqueous Phase 3$\underline{M}$ HNO$_3$-Uranyl Nitrate, 25° C.
(Process Solvent 0.2M CMPO-0.2M CE*)

| Diluent | No. of Carbons | Flash Point °C. | [U]org.M** |
|---|---|---|---|
| Undiluted TBP | | 193 | High |
| 1.2$\underline{M}$ TBP-Dodecane | 12 | 71 | 0.021 |
| 1.2$\underline{M}$ TBP-Norpar 12 | 11.5 | 69 | 0.038 |
| 1.2$\underline{M}$ TBP-Isopar-L | 12 | 61 | 0.14 |
| 1.2$\underline{M}$ TBP-Isopar-M | 13.5 | 80 | 0.042 |

*CE = D-t-BuCH18C6
**Maximum concentration of uranium in the process solvent without third phase formation.

As can be seen, undiluted TBP permits the extraction of the largest amount of uranium without third phase formation. Its viscosity, however, would necessitate operation of the process at elevated temperatures. Of the remaining process solvents, each a mixture of TBP in a paraffinic hydrocarbon (or hydrocarbons), the highest metal loading is obtained with the mixture of branch $C_{10}$ to $C_{12}$ hydrocarbons.

EXAMPLE II

Distribution ratios (D's) were determined by equilibration of the aqueous and organic phases in 13 by 100 mm Pyrex culture tubes with Teflon lined screw caps. Prior to the distribution ratio measurements, the organic phase was preconditioned three successive times with aqueous nitric acid of the concentration used for the measurements. The preconditioned organic phase was then added to a measured volume of the aqueous phase containing an appropriate tracer, ($^{99}$Tc, $^{85}$Sr, $^{241}$Am, $^{233}$U, or $^{239}$Pu). Chemical equilibration was attained by vigorous mixing the of two phases for several minutes. Distribution ratios were obtained at either 25° C. or 50° C., as noted. Temperature were regulated by means of a thermostatically controlled water bath. Radiometric assays of the aqueous and organic phases were performed using conventional liquid scintillation or gamma counting techniques, as appropriate. The results of these measurements are given in FIGS. 2 and 3.

Figure 2:
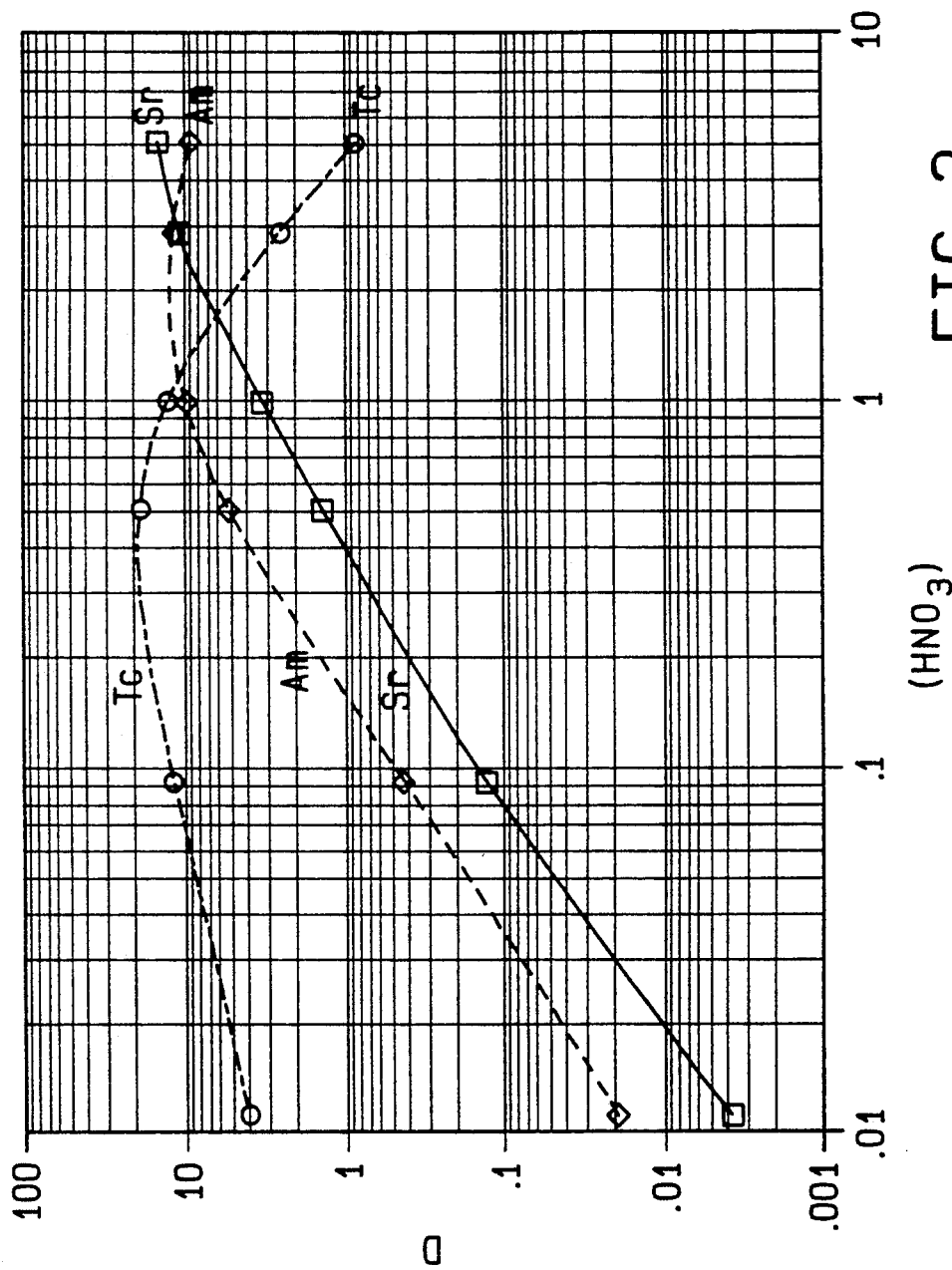
FIG. 2. is a graph showing the distribution ratios of various elements between CMPO and DtBuCH18C6 in TBP and various nitric acid concentrations.

FIG. 2 summarizes the results of distribution ratio measurements for technetium, americium, and strontium between 0.2M CMPO and 0.2M DtBuCh18C6 in TBP and various nitric acid solutions. For technetium, the distribution ratio (defined as [Metal]$_{org}$/[Metal]$_{aq}$) is seen to increase gradually up to about 0.5M HNO$_3$, then decline more steeply, failing below 1 to 5M HNO$_3$. The distribution ratio for americium is seen to increase between 0.1M and 1M HNO$_3$, peak at about 3M HNO$_3$, then begin a slow decline. Finally, the distribution ratio for strontium is observed to rise steadily over the entire range of HNO$_3$ concentration examined. Taken together, these results demonstrate that is will be possible to extract TC, Am, and Sr simultaneously into the process solvent from solutions containing 1-3M HNO$_3$.

Figure 3:
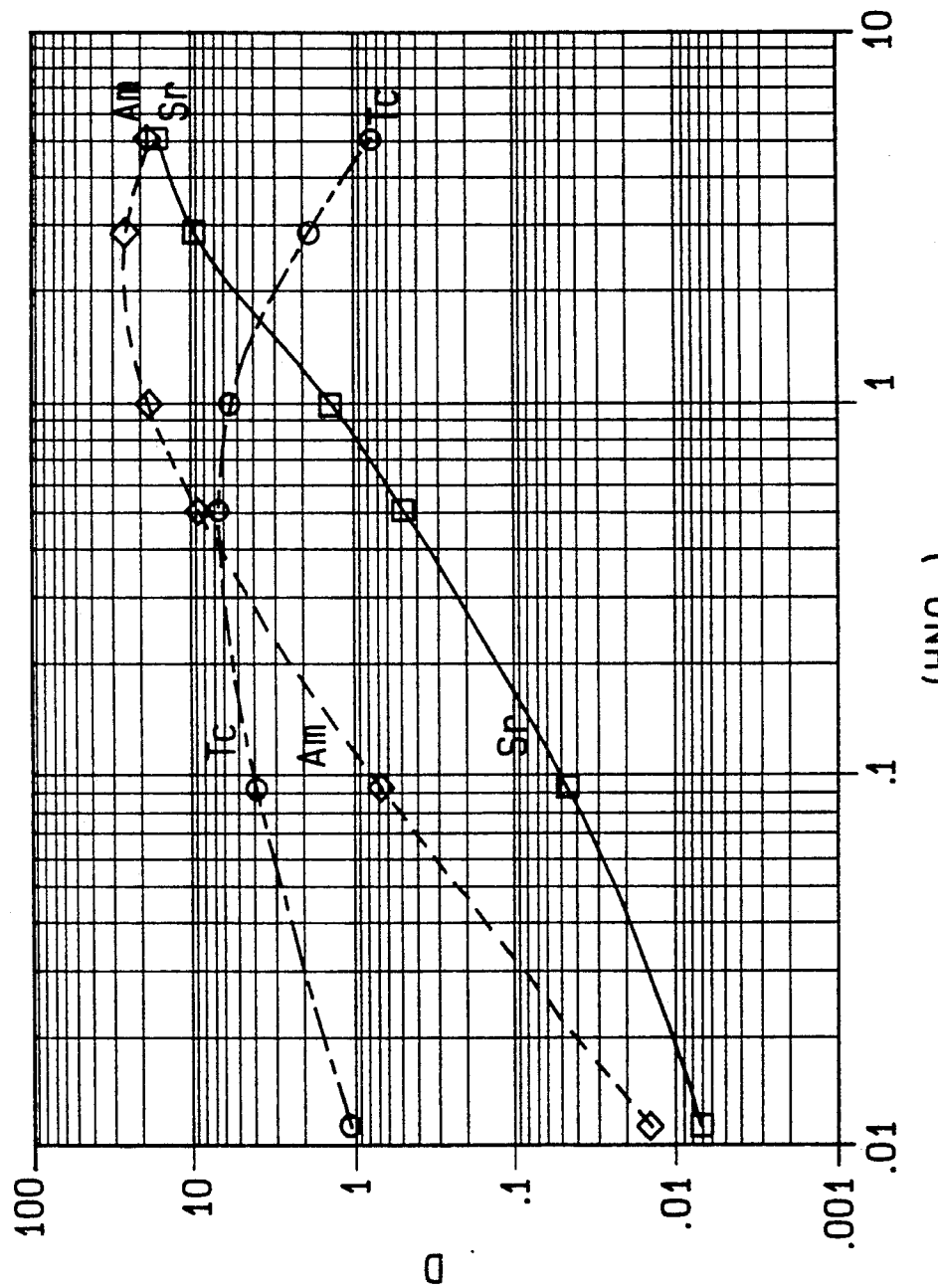
FIG. 3. is a graph showing the distribution ratios of various elements between CMPO, DtBuCH18C6 and TBP in a branched mixed paraffinic hydrocarbon of $C_{10}$ to $C_{12}$ and various nitric acid concentrations.

FIG. 3 summarizes the results of an analogous study using 0.2M CMPO, 0.2M DtBuCH18C6, 1.2M TBP in a branched hydrocarbon of $C_{10}$ to $C_{12}$. Although the absolute values of the distribution ratios obtained for each element at a given nitric acid concentration differ somewhat from those obtained with the process solvent described above, the same basic trends are observed. The results demonstrate the simultaneous extraction of Tc, Am, and Sr into the process solvent from 1 to 3M HNO$_3$.

EXAMPLE III

In order to evaluate the selectivity of the extractant solution for Sr, Tc and TRU's over the other constituents commonly encountered in nuclear waste solutions, the distribution of a number of insert and fission product elements between a solution of 0.2 CMPO, 0.2M DtBuCH18C6, 1.2M TBP in a mixed branched hydrocarbon of $C_{10}$ to $C_{12}$ and a synthetic dissolved waste sludge (DSW) acidified to either 1M or 3M with nitric acid was measured. The composition of the dissolved sludge is given in TABLE 2 below.

TABLE 2

COMPOSITION OF SYNTHETIC DISSOLVED SLUDGE WASTE*

| Acids | mol/L | Inert Constituents | mol/L |
|---|---|---|---|
| $HNO_3$ | 1.0 | Na | 0.15 |
| $H_2C_2O_4$ | 0.05 | Mg | 0.0017 |
|  |  | Al | 0.046 |
|  |  | Ca | 0.0014 |
| Anions** |  | Cr | 0.0013 |
| $F_2$ | 0.008 | Mn | 0.0044 |
| $SO_4$ | 0.012 | Fe | 0.15 |
| $NO_2$ | 0.005 | Ni | 0.008 |
|  |  | Cu | 0.0017 |
| Fission Products |  |  |  |
| Se** | $9.5 \times 10^{-5}$ | La | $8.0 \times 10^{-4}$ |
| Rb | Not Added | Ce | $2.3 \times 10^{-3}$ |
| Sr | $1.3 \times 10^{-3}$ | Pr | $7.1 \times 10^{-4}$ |
| Y | $6.0 \times 10^{-4}$ | Nd | $2.3 \times 10^{-3}$ |
| Zr | $3.2 \times 10^{-3}$ | Sm | $2.8 \times 10^{-4}$ |
| Mo | $1.8 \times 10^{-4}$ |  |  |
| Ru | $2.1 \times 10^{-3}$ | Eu | $4.5 \times 10^{-5}$ |
| Rh | $5.5 \times 10^{-4}$ |  |  |
| Pd | $5.4 \times 10^{-4}$ |  |  |
| Ag** | $3.0 \times 10^{-5}$ |  |  |
| Cd | $4.4 \times 10^{-5}$ |  |  |
| Te** | $3.3 \times 10^{-4}$ |  |  |
| Cs | Not Added |  |  |
| Ba | $6.6 \times 10^{-5}$ |  |  |

*This formulation was chosen to duplicate the expected composition of the solution resulting from the dissolution of sludge currently stored in single shelled tanks at the Westinghouse Hanford Site (Richland, WA) in nitric acid.
**Concentrations shown are based on the quantity added, not on ICP/AES analysis.

Tables 3, 4 and 5 below list the distribution ratios obtained for the inert, fission-product, and lanthanide fission-product constituents of DSW, respectively at two different nitric acid concentrations. As can be seen, each of the inert constituents is poorly extracted (D<<1). Similarly, many of the undesirable fission products are also not well extracted. (Palladium, yttrium, and barium are exceptions). Note that both Sr and Tc are extracted from the dissolved waste sludge, as are all of the lanthanide fission products.

TABLE 3

Distribution Ratios of Inert Constituents in DSW
Process Solvent 0.2M CMPO - 0.2M CE - 1.2M TBP-Isopar-L

| | | D's 25° C. | |
|---|---|---|---|
| Constituent | M | 1M $HNO_3$ | 3M $HNO_3$ |
| Na | 0.12 | $3.6 \times 10^{-2}$ | $9.3 \times 10^{-2}$ |
| Mg | $1.2 \times 10^{-3}$ | $2.7 \times 10^{-2}$ | $2.5 \times 10^{-2}$ |
| Al | $3.2 \times 10^{-2}$ | $6.1 \times 10^{-3}$ | $8.2 \times 10^{-3}$ |
| Ca | $9.4 \times 10^{-4}$ | $2.0 \times 10^{-1}$ | $1.7 \times 10^{-1}$ |
| Mn | $3.3 \times 10^{-3}$ | $1.2 \times 10^{-2}$ | $2.4 \times 10^{-2}$ |
| Fe | 0.11 | $5.3 \times 10^{-2}$ | $1.8 \times 10^{-1}$ |
| Ni | $5.6 \times 10^{-3}$ | $1.8 \times 10^{-3}$ | $2.1 \times 10^{-3}$ |
| Cu | $1.3 \times 10^{-3}$ | $6.9 \times 10^{-3}$ | $1.1 \times 10^{-2}$ |

TABLE 4

Distribution Ratios of Fission Products in DSW
Process Solvent 0.2M CMPO - 0.2M CE - 1.2M TBP-Isopar-L

| | | D's | |
|---|---|---|---|
| Constituent | M | 1M $HNO_3$ | 3M $HNO_3$ |
| Rb | $2.1 \times 10^{-4}$ | 0.19 | 0.31 |
| Sr | $1.0 \times 10^{-3}$ | 2.9 | 12 |
| Y | $5.5 \times 10^{-4}$ | 1.8 | 1.7 |
| Zr | $2.4 \times 10^{-3}$ | $2.7 \times 10^{-2}$ | $5.2 \times 10^{-2}$ |
| Mo | $1.3 \times 10^{-4}$ | $2.3 \times 10^{-1}$ | $2.9 \times 10^{-1}$ |
| Tc | Trace | 9.1 | 3.7 |
| Ru | $1.6 \times 10^{-3}$ | $1.7 \times 10^{-1}$ | $1.2 \times 10^{-1}$ |
| Rh | $4.4 \times 10^{-4}$ | $<5 \times 10^{-2}$ | $<5 \times 10^{-2}$ |
| Pd | $4.7 \times 10^{-4}$ | 1.1 | $6.4 \times 10^{-1}$ |
| Cd | $3.4 \times 10^{-5}$ | $<5 \times 10^{-2}$ | $1.2 \times 10^{-1}$ |
| Cs | $1.0 \times 10^{-3}$ | $3.4 \times 10^{-2}$ | $3.9 \times 10^{-2}$ |
| Ba | $4.6 \times 10^{-5}$ | 1.3 | 2.6 |

TABLE 5

Distribution Ratios of Lanthanide Fission Products in DSW
Process Solvent 0.2M CMPO - 0.2M CE - 1.2M TBP-Isopar-L

| | | D's | |
|---|---|---|---|
| Constituent | M | 1M $HNO_3$ | 3M $HNO_3$ |
| La | $8.7 \times 10^{-4}$ | 6.4 | 3.2 |
| Ce | $2.0 \times 10^{-3}$ | 11 | 5.9 |
| Pr | $7.0 \times 10^{-4}$ | — | 11 |
| Nd | $2.4 \times 10^{-3}$ | 10 | 7.2 |
| Sm | $2.2 \times 10^{-4}$ | >10 | 8.0 |
| Eu | $4.3 \times 10^{-5}$ | 16 | 8.3 |

EXAMPLE IV

The distribution ratios of five elements-Am, Pu, U, Sr, and Tc-were measured between an extractant solution of 0.2M CMPO, 0.2M DtBuCH18C6, 1.2M TBP in a branched paraffinic hydrocarbon of $C_{10}$ to $C_{12}$ and several different aqueous phases chosen to represent the various aqueous phases of the flowsheet of FIG. 1 as described above. The results are given in TABLE 6 below.

TABLE 6

Distribution Ratios of Selected Elements Between Dissolved Sludge Waste
DSW-1 (0.2M Oxalic Acid - 1M $HNO_3$)
DSW-3 (0.2M Oxalic Acid - 3M $HNO_3$)
Process Solvent (0.2M CMPO - 0.2M CE - 1.2M TBP-Isopar-L)

| | D (25° C.) | | | | |
|---|---|---|---|---|---|
| | Am | Pu | U | Sr | Tc |
| DSW-1 | 16 | $>10^2$ | $>10^2$ | 2.9 | 9.1 |
| DSW-3 | 9.1 | $>10^2$ | $>10^2$ | 12 | 3.7 |
| Scrub (1M $HNO_3$) | 19 | $>10^3$ | $>10^2$ | 3.3 | 10 |
| Strip (0.1M TCA) | $10^{-2}$ | $10^{-1}$ | 11 | $<10^{-1}$ | 20 |
| Wash (0.25M $Na_2CO_3$) | — | — | 0.07 | — | 0.08 |

As can be seen, each of the elements is extracted from the DSW feed solution (D>1). Similarly distribution ratios greater than one are obtained for each element when 1M $HNO_3$ is used as the aqueous phase, indicating that little loss of these elements will occur during the scrubbing of the extractant solution. Finally, as shown, the distribution ratios of Sr and TRU's between a 0.1M solution of THFTCA and the extractant solution are all less than one, while those of U and Tc are much greater (>10). This demonstrates the selectively stripping of Sr and TRU's from the loaded extractant. The U and TC remaining in the organic phase can then be washed out of the extractant by contacting it with a solution of 0.25M $Na_2CO_3$, as indicated by the low distribution ratios obtained for the two elements.

It can be seen from the preceding Examples and discussion that the process of the invention, for the simultaneous recovery of TRU's together with Sr from nitric acid solutions is effective and presents a substantial improvement over prior art processes.

The embodiments of this invention in which an exclusive property or privilege is claimed are defined as follows:

1. A process of recovering strontium, neptunium, americium and plutonium values from an aqueous nitric acid feed solution containing these and other fission product values comprising:

contacting the aqueous solution containing the values with an extractant solution consisting of a crown ether and n-octyl(phenyl)-N,N-diisobutylcarbamoylmethylphosphine oxide in a diluent, said diluent being selected from the group consisting of tri-n-butylphosphate, a normal paraffinic hydrocarbon, and a iso paraffinic hydrocarbon, said hydrocarbons having 10 to 15 carbons and containing a phase modifier, maintaining the contact for a period of time sufficient for the strontium, neptunium, americium and plutonium values together with any uranium and technetium values in the feed solution to be taken up by the extractant, and contacting the loaded organic extractant solution with a strip solution which may be either an aqueous solution of tetrahydrofuran-2,3,4,5-tetracarboxylic acid or an aqueous solution of nitric acid and hydrogen fluoride, to strip the neptunium, plutonium, americium, and strontium values from the extractant, thereby recovering the strontium, neptunium, americium and plutonium values.

2. The process of claim 1 wherein the crown ether has the formula: 4,4'(5')[R,R']dicyclohexano-18-crown-6, where R and R' are one or more members selected from the group consisting of straight and branched alkyl containing 1 to 12 carbons.

3. The process of claim 2 wherein R and R' are one or more members of the group consisting of methyl, propyl, isobutyl, t-butyl, hexyl, and heptyl.

4. The method of claim 3 wherein the diluent is selected from the group consisting of dodecane, a mixture of n-paraffinic hydrocarbons containing 10 to 13 carbons, a mixture of iso-paraffinic hydrocarbons containing 12 to 15 carbons, and a mixture of iso-paraffinic hydrocarbons containing 10 to 12 carbons.

5. The process of claim 4 wherein the phase modifier is selected from the group consisting of tri-n-butyl phosphate, dibutyl butylphosphonate, and tris(ethylhexyl)phosphine oxide.

6. The method of claim 5 wherein the phase modifier is tri-n-butylphosphate.

7. The method of claim 6 wherein the extractant solution is about 1.2M in tri-n-butylphosphate.

8. The method of claim 1 wherein the extractant contains about 2.0M bis-4,4'(5)[(t-butyl)cyclohexano]-18-crown-6 in tri-n-butylphosphate as a diluent.

9. The method of claim 1 wherein the extractant contains about 0.2M bis-4,4'(5)[(t-butyl)cyclohexano]-18-crown-6, and about 1.2M tri-n-butylphosphate in an diluent selected from the group consisting of dodecane, a mixture of n-paraffinic hydrocarbons containing 10 to 13 carbons, a mixture of iso-paraffinic hydrocarbons containing 12 to 15 carbons, and a mixture of iso-paraffinic hydrocarbons containing 10 to 12 carbons.

10. The method of claim 9 wherein the diluent is a mixture of iso-paraffinic hydrocarbons containing 10 to 12 carbons.

11. The method of claim 9 wherein the diluent is dodecane.

12. The method of claim 9 wherein the diluent is a mixture of iso-paraffinic hydrocarbons containing 12 to 15 carbons.

13. The method of claim 9 wherein the diluent is a mixture is n-paraffinic hydrocarbons containing 10 to 13 carbons.

14. A process of recovering strontium, neptunium, americium and plutonium values from an aqueous nitric acid feed solution containing these and other fission product values comprising:

adjusting the aqueous nitric acid feed solution to contain from 1 to 3M in nitric acid, contacting the aqueous feed solution with an extractant solution consisting of about 0.2M n-octyl(phenyl)-N,N-diisobutylcarbamoylmethylphosphine oxide, about 0.2M bis-4,4'(5)[(t-butyl)cyclohexano]-18-crown-6, and about 1.2M tri-n-butylphosphate as a phase modifier in a diluent which is a mixture of iso-paraffinic hydrocarbons containing 10 to 12 carbons, maintaining the contact for a period of time sufficient for the strontium, neptunium, americium and plutonium values together with any uranium and technetium values in the feed solution to be taken up by the extractant, separating the extractant from the feed solution contacting the loaded extractant solution with an aqueous solution about 1 to 3M in nitric acid to scrub any iron, barium or fission products which may have been carried over into the extractant, and contacting the loaded organic extractant solution with an aqueous strip solution of about 0.1 to 0.5M tetrahydrofuran-2,3,4,5-tetracarboxylic acid to selectively strip the neptunium, plutonium, americium, and strontium values from the extractant, thereby recovering the strontium, neptunium, americium and plutonium values.

15. The process of claim 14 wherein the extractant solution is then contacted with a second aqueous strip solution of about 0.1 to 0.5M sodium carbonate to strip the uranium and technetium values from the extractant, thereby recovering the uranium and technetium values from the extractant solution.

* * * * *